(12) United States Patent
Kim

(10) Patent No.: US 12,509,070 B2
(45) Date of Patent: Dec. 30, 2025

(54) VEHICLE CONTROL METHOD, VEHICLE CONTROL DEVICE, AND VEHICLE CONTROL SYSTEM INCLUDING SAME

(71) Applicant: HL KLEMOVE CORP., Incheon (KR)

(72) Inventor: Dong Ik Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 622 days.

(21) Appl. No.: 17/614,369

(22) PCT Filed: May 21, 2020

(86) PCT No.: PCT/KR2020/006631
§ 371 (c)(1),
(2) Date: Nov. 26, 2021

(87) PCT Pub. No.: WO2020/246735
PCT Pub. Date: Dec. 10, 2020

(65) Prior Publication Data
US 2022/0234581 A1 Jul. 28, 2022

(30) Foreign Application Priority Data
Jun. 7, 2019 (KR) ........................ 10-2019-0067524

(51) Int. Cl.
*B60W 30/095* (2012.01)
*B60W 50/14* (2020.01)

(52) U.S. Cl.
CPC ........ *B60W 30/0956* (2013.01); *B60W 50/14* (2013.01); *B60W 2510/20* (2013.01);
(Continued)

(58) Field of Classification Search
CPC ............. B60W 30/0956; B60W 50/14; B60W 2510/20; B60W 2520/06; B60W 2520/10;
(Continued)

(56) References Cited

U.S. PATENT DOCUMENTS 10,239,452 B1 * 3/2019 Szczepaniak ......... B60W 50/14
2012/0306663 A1 12/2012 Mudalige
(Continued)

FOREIGN PATENT DOCUMENTS

CN 102765365 A 11/2012
CN 102806912 A 12/2012
(Continued)

OTHER PUBLICATIONS

Kroll, Jess; How to Calculate a Turning Circle, 2016, ehow.co.uk (Year: 2016).*
(Continued)

*Primary Examiner* — Aniss Chad
*Assistant Examiner* — Chase L Cooley
(74) *Attorney, Agent, or Firm* — WOMBLE BOND DICKINSON (US) LLP

(57) ABSTRACT

The present disclosure relates to a vehicle control method, a vehicle control device, and a vehicle control system including same. Specifically, a vehicle control device according to the present disclosure includes: a vehicle travel route estimation unit which estimates a first travel route of a vehicle on the basis of the turn radius and traveled distance of the vehicle, when the speed of the vehicle is equal to or less than a preset speed; a target travel route predicter which confirms a target from periphery detection information about the periphery of the vehicle, and predicts a second travel route of the target; a collision determiner which determines whether there is a possibility of a collision between the vehicle and the target; and a vehicle control unit which controls to perform at least one among an alert control, a brake control, and an avoidance control, when there is a possibility of a collision between the vehicle and the target.

17 Claims, 15 Drawing Sheets

(52) U.S. Cl.
CPC ..... *B60W 2520/06* (2013.01); *B60W 2520/10* (2013.01); *B60W 2530/20* (2013.01); *B60W 2530/201* (2020.02); *B60W 2540/18* (2013.01); *B60W 2554/00* (2020.02); *B60W 2554/4029* (2020.02); *B60W 2710/18* (2013.01)

(58) Field of Classification Search
CPC ....... B60W 2530/20; B60W 2530/201; B60W 2540/18; B60W 2554/00; B60W 2554/4029; B60W 2710/18; B60W 2530/18; B60W 2552/30; B60W 2554/804; B60W 10/18; B60W 30/08; B60W 40/02; B60W 40/10; B60Y 2300/08; B60Y 2400/303
See application file for complete search history.

(56) References Cited

U.S. PATENT DOCUMENTS

| | | | |
|---|---|---|---|
| 2013/0124041 A1 | 5/2013 | Belser et al. | |
| 2018/0162387 A1 | 6/2018 | Sung et al. | |
| 2018/0174462 A1* | 6/2018 | Um | B60W 40/12 |
| 2020/0108828 A1 | 4/2020 | Yue et al. | |
| 2020/0142417 A1* | 5/2020 | Hudecek | B60W 30/0953 |
| 2021/0053561 A1* | 2/2021 | Beller | G08G 1/166 |

FOREIGN PATENT DOCUMENTS

| | | |
|---|---|---|
| CN | 108082185 A | 5/2018 |
| CN | 108162760 A | 6/2018 |
| CN | 108216220 A | 6/2018 |
| JP | 2017-154516 | 9/2017 |
| KR | 10-1568745 | 11/2015 |
| KR | 10-2018-0065585 | 6/2018 |
| KR | 10-2018-0070402 | 6/2018 |
| WO | WO-2016163590 A1 * | 10/2016 |

OTHER PUBLICATIONS

Fatimaezzahra Saber, Mohamed Ouahi, Abdelmjid Saka; Vehicle Dynamics and Steering Angle Estimation Using a Virtual Sensor, 2016, HAL Open Science, pp. 3 (Year: 2016).*

International Search Report for PCT/KR2020/006631 mailed on Aug. 12, 2020 (now published as WO 2020/246735) with English translation provided by WIPO.

Written Opinion of the International Searching Authority for PCT/KR2020/006631 mailed on Aug. 12, 2020 (now published as WO 2020/246735) with English translation provided by Google Translate.

Office Action dated Apr. 10, 2024 for Chinese Patent Application No. 202080041947.0 and its English machine translation provided by Google.

Office Action dated Nov. 19, 2024 for Korean Patent Application No. 10-2019-0067524 and its English translation by Google Translate.

* cited by examiner

VEHICLE CONTROL METHOD, VEHICLE CONTROL DEVICE, AND VEHICLE CONTROL SYSTEM INCLUDING SAME

TECHNICAL FIELD

The present disclosure relates to a vehicle control device, a method for controlling vehicles using the same, and a system that includes the device and is capable of implementing the method.

BACKGROUND ART

In general, various convenience mechanisms for providing operators with information on driving statuses or conditions have been increasingly installed in vehicles for more stable and comfortable driving. In addition to the demand for such convenience mechanisms, there has been increasing demand for devices for vehicle safety. As the vehicle safety devices, there have been provided active safety systems for preventing vehicle accidents and dangers in advance, such as an antilock braking system (ABS), an electronic controlled suspension (ECS) system, and the like, and passive safety devices for recording information related to vehicle accidents, such as a vehicle black box, and the like.

Recently, autonomous driving vehicles including unmanned ground vehicles (UGV) have been widely used in military and commercial applications. These applications require such autonomous driving vehicles to move freely in an unknown environment with dynamic and physical limitations, rather than simply following pre-planned routes and algorithms in an off-line traveling environment.

Research on the autonomous driving vehicles includes active driving or steering in complex environments. A model prediction method based on continuous on-line optimization control is used in order to generate dynamic trajectories related to obstacle avoidance.

To do this, in a typical model prediction method, a probability of a potential collision between a vehicle and a target is determined uniformly through the calculation of a turning radius of the vehicle using a driving information detection sensor such as a yaw rate sensor etc., and the prediction of a traveling path of the vehicle.

However, one significant disadvantage of the typical model prediction method is that in an environment with a low probability of slipperiness, an environment in which the vehicle travels at a low speed, and the like, a turning radius calculated by the yaw rate sensor may cause an error in predicting a traveling path. Further, the typical model prediction method has an additional disadvantage of causing an error because a probability of a potential collision is uniformly determined without considering the characteristics of obstacles.

DETAILED DESCRIPTION OF THE INVENTION

Technical Problem

To address these issues, embodiments of the present disclosure provide vehicle control methods and vehicle control devices for accurately predicting a traveling path, and systems that include the device and are capable of implementing the method.

Technical Solution

According to one aspect of the present disclosure, a vehicle control device is provided that includes a vehicle traveling path predicter capable of calculating a turning radius based on a steering angle of a steering wheel and a steering ratio of a vehicle, calculating a traveling distance based on at least one of a vehicle speed of the vehicle and a pulse signal of at least one wheel, and predicting a first traveling path of the vehicle based on the turning radius and the traveling distance, a target traveling path predicter capable of identifying a target based on information acquired by detecting objects in the vicinity of the vehicle, and predicting a second traveling path of the target, a collision probability determiner capable of setting a collision determination boundary region corresponding to a size of the vehicle, and determining the probability of a potential collision between the vehicle and the target based on the collision determination boundary region, the first traveling path, the target, and the second traveling path, and a vehicle controller capable of controlling at least one of a warning control, a braking control, and an avoidance control to be performed when the probability of the potential collision between the vehicle and the target is present.

According to another aspect of the present disclosure, a vehicle control method is provided that includes a vehicle traveling path prediction step of calculating a turning radius based on a steering angle of a steering wheel and a steering ratio of a vehicle, calculating a traveling distance based on a vehicle speed of the vehicle, and predicting a first traveling path of the vehicle based on the turning radius and the traveling distance, a target traveling path prediction step of identifying a target based on information acquired by detecting objects in the vicinity of the vehicle, and predicting a second traveling path of the target, a collision probability determination step of setting a collision determination boundary region corresponding to a size of the vehicle, and determining the probability of a potential collision between the vehicle and the target based on the collision determination boundary region, the first traveling path, the target, and the second traveling path, and a vehicle control step of controlling at least one of a warning control, a braking control, and an avoidance control to be performed when the probability of the potential collision between the vehicle and the target is present.

According to further another aspect of the present disclosure, a vehicle control system is provided that includes a steering angle sensor for detecting a steering angle of a steering wheel, a vehicle speed sensor for detecting a speed of a vehicle, an object detection sensor for detecting objects in the vicinity of the vehicle, a vehicle control device capable of determining the probability of a potential collision between a target present in the vicinity of the vehicle and the vehicle, and controlling the vehicle when the probability of the potential collision is present, and a driving device configured to operate by the control of the vehicle control device, the vehicle control device being capable of: receiving steering angle information from the steering angle sensor, vehicle speed information from the vehicle speed sensor, and object detection information from the object detection sensor; calculating a turning radius based on the steering angle and a steering ratio of the vehicle; calculating a traveling distance based on the vehicle speed; predicting a first traveling path of the vehicle based on the turning radius and the traveling distance; predicting a second traveling path of the target by identifying the target based on the object detection information; setting a collision determination boundary region corresponding to a size of the vehicle; determining the probability of a potential collision between the vehicle and the target based on the collision determination boundary region, the first traveling path, the target, and the second traveling path; and controlling the driving device to perform at least one of a warning control, a braking control, and an avoidance control when the probability of the potential collision between the vehicle and the target is present.

Effects of the Invention

According to embodiments of the present disclosure, it is possible to provide vehicle control methods and vehicle control devices for accurately predicting a traveling path, and systems that include the device and are capable of implementing the method.

BEST MODE FOR CARRYING OUT THE INVENTION

Figure 1:
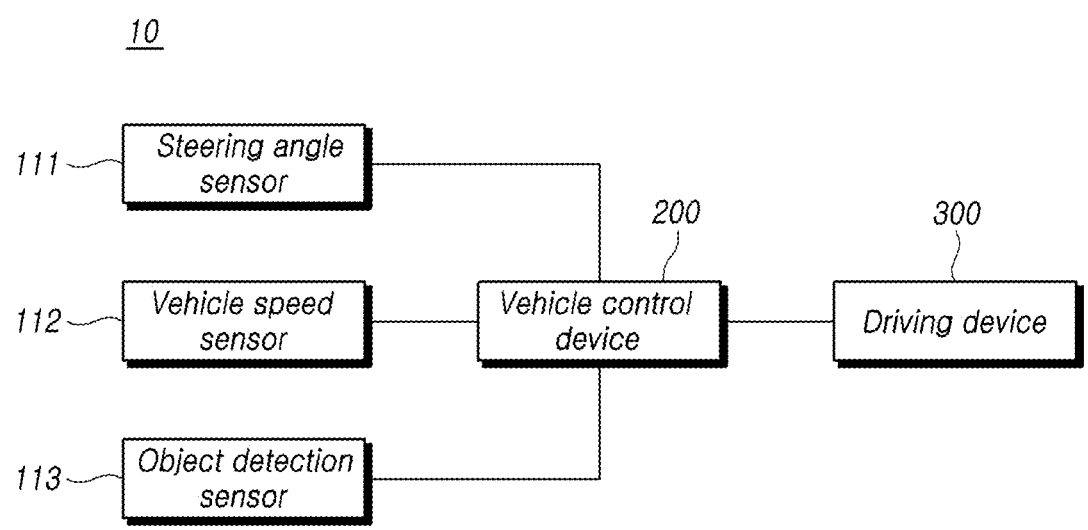
FIG. 1 is a block diagram schematically illustrating a vehicle control system according to aspects of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram schematically illustrating a vehicle control system according to aspects of the present disclosure.

Referring to FIG. 1, the vehicle control system 10 according to aspects of the present disclosure may refer to a system for controlling a vehicle to avoid a collision between the vehicle and an obstacle.

The vehicle control system 10 may include a steering angle sensor 111, a vehicle speed sensor 112, an object detection sensor 113, a vehicle control device 200, a driving device 300, and the like.

The steering angle sensor 111 can detect a steering angle of a steering wheel. Specifically, when the steering wheel is turned by a driver, the steering angle sensor 111 can detect a steering angle caused by the turning of the steering wheel, and output information on the detected steering angle to the vehicle control device 200.

The vehicle speed sensor 112 can detect a vehicle speed of a vehicle. Specifically, the vehicle speed sensor 112 can detect a rotational speed of at least one vehicle wheel, convert the detected rotational speed into a corresponding vehicle speed, and output information on the vehicle speed to the vehicle control device 200.

The object detection sensor 113 can detect situations or objects in the vicinity of the vehicle, for example, one or more nearby vehicles, one or more obstacles, and the like. That is, the object detection sensor 113 can detect situations or objects in the vicinity of the vehicle, and output object detection information to the vehicle control device 200.

In some embodiments, the object detection sensor 113 may include a camera, a lidar, a radar, an ultrasonic sensor, and the like. However, embodiments of the present disclosure are not limited thereto.

The object detection sensor 113 may be disposed on the outside of the vehicle, and include multiple object detection sensors 113 of different types or the same type.

The vehicle control device 200 can determine the probability of a potential collision between a target present in the vicinity of the vehicle and the vehicle, and control the vehicle when the probability of the potential collision is present. In one embodiment, when it is determined that the probability of the potential collision is present, the vehicle control device 200 can output a control signal to the driving device 300 to cause a collision between the vehicle and the target to be avoided.

The vehicle control device 200 can receive the steering angle information, the vehicle speed information, and the object detection information, predict a traveling path of the vehicle, predict a traveling path of the target, determine the probability of a potential collision between the vehicle and the target, and output a control signal to the driving device 300 when the probability of the potential collision is present.

The vehicle control device 200 may be implemented with electronic components such as an electronic control unit (ECU), a domain control unit (DCU), and the like and software; however, embodiments of the present disclosure are not limited thereto.

The vehicle control device 200 will be described below in further detail with reference to FIG. 2.

The driving device 300 may be driven by the control of the vehicle control device 200. Specifically, when the vehicle control device 200 outputs a control signal, the driving device 300 can receive the control signal and perform a control operation indicated by the control signal.

The driving device 300 may be, for example, one or more of a braking device for braking the vehicle, a steering actuator for performing avoidance steering of the vehicle, a display for visually displaying a warning message to drivers, a warning device for outputting a warning sound, a haptic actuator for tactilely signaling to drivers, and the like. However, embodiments of the present disclosure are not limited thereto.

Although not shown, the vehicle control system 10 according to according to aspects of the present disclosure may further include a yaw rate sensor, a torque sensor, a heading angle detection sensor, a wheel pulse sensor for detecting a pulse signal of at least one vehicle wheel, and the like.

Hereinafter, the vehicle control device 200 according to aspects of the present disclosure will be described in further detail.

Figure 2:
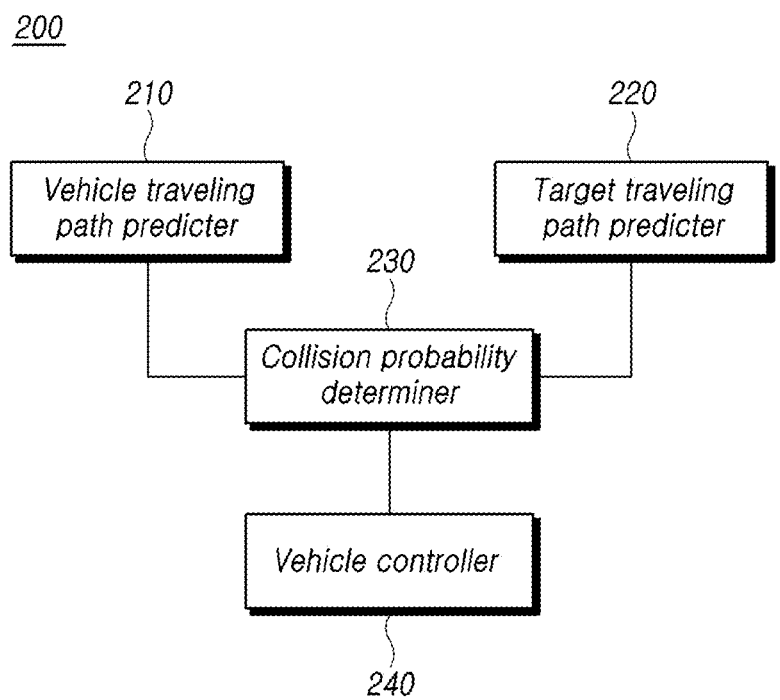
FIG. 2 is a block diagram schematically illustrating a vehicle control device according to aspects of the present disclosure.

FIG. 2 is a block diagram schematically illustrating the vehicle control device 200 according to aspects of the present disclosure.

Referring to FIG. 2, the vehicle control device 200 according to aspects of the present disclosure may include a vehicle traveling path predicter 210, a target traveling path predicter 220, a collision probability determiner 230, a vehicle controller 240, and the like.

The vehicle traveling path predicter 210 can calculate a turning radius based on a steering angle of a steering wheel and a steering ratio of a vehicle, calculate a traveling distance based on at least one of a vehicle speed of the vehicle and a pulse signal of at least one wheel, and predict a first traveling path of the vehicle based on the turning radius and the traveling distance.

For example, the vehicle traveling path predicter 210 can predict the first traveling path when the vehicle speed of the vehicle is less than or equal to a preset speed. For example, while the vehicle enters a parking mode or a driving mode and travels at a speed less than or equal to a preset speed, the vehicle control device 200 can determine a probability of a potential collision by performing operations according to embodiments of the present disclosure. This is because, when the vehicle travels at a preset speed or less, the accuracy of the collision probability determination technique according to the embodiments described herein can be further increased. In this situation, when the vehicle speed is less than or equal to a preset speed, one or more additional collision probability determination logics may be used, taken alone or in combination with the above collision probability determination technique, as a slip event of at least a vehicle wheel with respect to a road surface occurs. Hereinafter, for convenience of description, discussions will be given on a situation where the vehicle speed is less than or equal to a preset speed. However, it should be understood that the collision probability determination method and the collision probability prediction according to embodiments of the present disclosure may be applied to a situation where the vehicle speed is greater than or equal to the preset speed.

Here, the steering ratio may refer to a ratio between a steering angle of the steering wheel and a steering angle of at least one front wheel. That is, the steering ratio may be obtained by dividing the steering angle of the steering wheel by the steering angle of at least one front wheel. For example, when steering angles of the steering wheel and the front wheel are 480 degrees and 30 degrees, respectively, a steering ratio may be 480/30=16. The steering ratio may be generally 12 to 20; however, embodiments of the present disclosure are not limited thereto.

Meanwhile, the steering ratio may have different values for a left front wheel and a right front wheel in a dynamic modeling of a vehicle. For example, in the case of a vehicle modeling, a steering ratio for the left front wheel and a steering ratio for the right front wheel may be different from each other. This is because the Acicenman-Jantoud type, in which all positions over a path, along which a vehicle turns, draw a concentric circle, is applied. That is, according to the Ackerman jigsaw type, this is because a wheel that draws an inner circle of a vehicle that turns (e.g., a right front wheel of a vehicle that turns right) rotates in larger quantity than a wheel that draws an outer circle (e.g., a left front wheel of the vehicle that turns right).

Further, the steering ratio may have a different value depending on which any of dynamic modelings is applied. For example, in the case of a bicycle modeling, a steering ratio may be a value obtained by dividing the steering angle of the steering wheel by an average of respective steering angles of the left front wheel and the right front wheel in the vehicle modeling.

Such a steering ratio may be stored in advance based on measured data. In some embodiments, the steering ratio may be determined by data designed by a designer, or be calculated based on a calculation algorithm after measuring a turning radius drawn when the steering wheel is turned using a differential global positioning system (DGPS), or be a value processed in a data form based on a measurement resulting from physically measuring a rotation angle of at least one wheel as the steering wheel turns. However, embodiments of the present disclosure are not limited thereto.

In another embodiment, the steering ratio may be determined in real time while the vehicle is driving, and the determined steering ratio may be stored in a memory. In this situation, a pre-stored steering ratio may be updated based on the determined steering ratio.

The method of calculating a turning radius based on a steering angle and a steering ratio of a vehicle will be described below in further detail with reference to FIGS. 3 and 4. The method of calculating a traveling distance using a vehicle speed, a pulse signal from at least one vehicle wheel, and the like, and the method of predicting a first traveling path of the vehicle will be described below in further detail with reference to FIG. 5.

The target traveling path predictor 220 can identify at least one target based on object detection information acquired by detecting situations or objects in the vicinity of the vehicle, and predict a second traveling path of the target. The object detection information may refer to information output by at least one object detection sensor 113 (e.g., a camera, etc.) described above with reference to FIG. 1.

Various methods may be employed for identifying the target from the object detection information. In one embodiment, the target traveling path predictor 220 can calculate pixel values of a still or moving image acquired by the camera, classify the calculated pixel values into one or more groups, each of which contains regions having similar color values, and extract one of the one or more groups as one target, or a respective target for each group.

In another embodiment, the target traveling path predictor 220 can detect a boundary line in the still or moving image generated by the camera using an edge detection algorithm, such as a canny edge detection algorithm, a line edge algorithm, a laplacian edge detection algorithm, and the like, and then extract an object. However, embodiments of the present disclosure are not limited thereto.

The method of predicting the second traveling path will be described below in further detail with reference to FIGS. 6 and 7.

The collision probability determiner 230 can set a collision determination boundary region corresponding to a size of a vehicle, and determine the probability of a potential collision of the vehicle based on the collision determination boundary region, the first traveling path, the target, and the second traveling path.

The collision determination boundary region may refer to an outline set in the vehicle to determine a potential collision. A size of the collision determination boundary region may be set to correspond to a size of a vehicle. In one embodiment, the size of the vehicle may be obtained from vehicle specification information stored in advance, and include a lateral width (or an entire width) and a longitudinal length (or an entire length) of the vehicle. In another embodiment, the size of the collision determination boundary region may be set for each portion divided based on a size of a vehicle.

For example, the collision probability determiner 230 can determine that a probability of a potential collision is present when the collision determination boundary region is overlaid with a target at a specific time. The method of determining the probability of the potential collision will be described below in further detail with reference to FIGS. 12 and 13.

When the probability of the potential collision between the vehicle and the target is present, the vehicle controller 240 can perform at least one of a warning control, a braking control, and an avoidance control. In one embodiment, if the probability of the potential collision is present, the vehicle controller 240 can output a warning control signal to the warning device, output a brake control signal to the braking device, and/or output an avoidance control signal to the steering actuator.

Although not shown, the vehicle control device 200 according to aspects of the present disclosure may further include a memory for storing steering ratios, vehicle specification information, and the like, and a processor for processing input information.

Hereinafter, embodiments of calculating a turning radius will be described in further detail.

Figure 3:
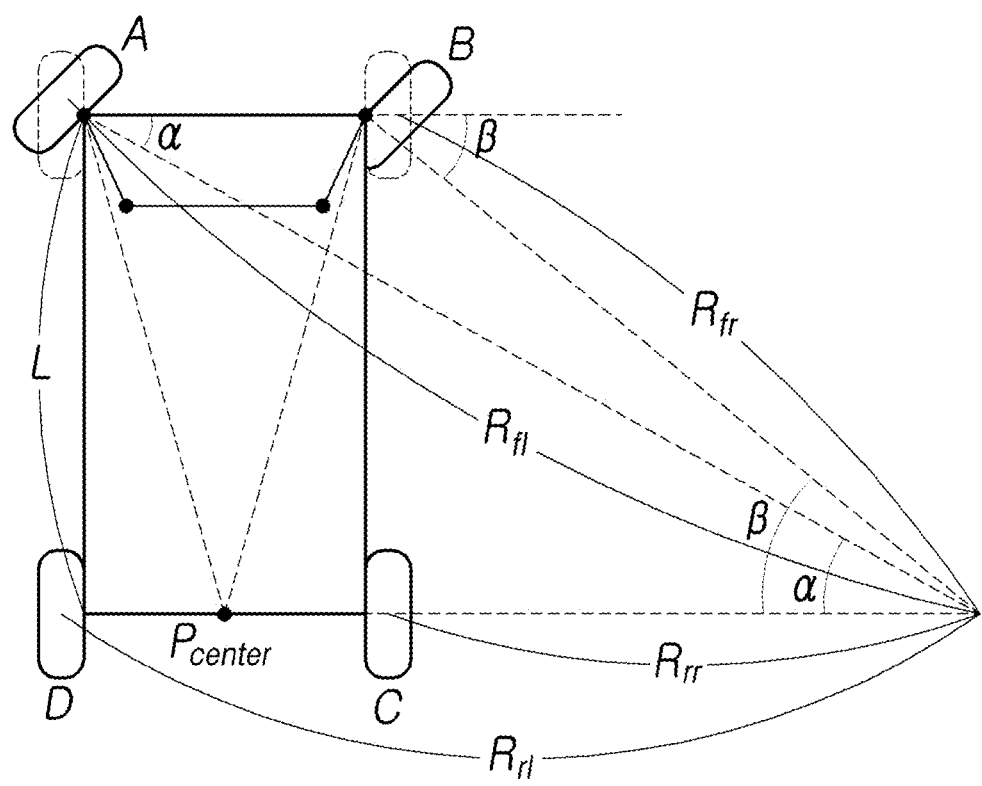
FIG. 3 illustrates an example of calculating a turning radius in the vehicle control device and/or system according to aspects of the present disclosure.

FIG. 3 illustrates an example of calculating a turning radius in the vehicle control device and/or system according to aspects of the present disclosure.

The turning radius can be calculated based on dynamic modelings of a vehicle. Such a dynamic modeling of the vehicle may include, for example, the vehicle modeling, the bicycle modeling, and the like. However, embodiments of the present disclosure are not limited thereto.

For example, the vehicle traveling path predictor 210 can calculate a steering angle of at least one wheel of a vehicle based on a steering angle and a steering ratio, and calculate a turning radius using the steering angle of the vehicle wheel and a distance between wheel shafts, such as a distance between a front wheel shaft to which front wheels are connected and a rear wheel shaft to which rear wheels are connected, stored in advance.

The distance between wheel shafts may be included in vehicle specification information stored in advance, as described above.

In this case, the turning radius may be a distance between the center of a circle and the center of at least one front wheel of the vehicle, or a distance between the center of the circle and the center of at least one rear wheel of the vehicle.

In one embodiment, based on at least one front wheel, the vehicle traveling path predictor 210 can calculate a steering angle of the front wheel by dividing a steering angle of the steering wheel by a steering ratio. Further, the vehicle traveling path predictor 210 can calculate a turning radius Rf by substituting the steering angle of the front wheel and a first distance between wheel shafts stored in advance into Equation 1 below.

$$R_f = \frac{L}{\sin\theta_W}, \theta_W = \frac{\theta_{SW}}{r} \qquad \text{[Equation 1]}$$

Here, L is a first distance between wheel shafts, $\theta_W$ is a steering angle of a front wheel, $\theta_{SW}$ is a steering angle of a steering wheel, and r is a steering ratio.

Meanwhile, the vehicle modeling generally includes multiple front wheels, and as described above, respective steering ratios for front wheels may be different from each other.

Accordingly, multiple radii may be calculated due to the multiple front wheels and have different values.

In this case, the vehicle traveling path predicter 210 can finally calculate one turning radius serving as a reference based on the multiple radii.

That is, based on the vehicle modeling, the vehicle traveling path predicter 210 can store in advance multiple steering ratios respectively corresponding to multiple front wheels included in the vehicle modeling, calculate respective steering angles of the multiple front wheels based on the steering angle of the steering wheel and the multiple steering ratios, calculate multiple radii using the respective steering angles of the multiple front wheels and the first distance between wheel shafts, and calculate a turning radius using the calculated multiple radii.

More specifically, referring to FIG. 3, the vehicle traveling path predicter 210 can store in advance a first steering ratio of a first front wheel (left front wheel, A) and a second steering ratio of a second front wheel (right front wheel, B) in the vehicle modeling.

Thereafter, the vehicle traveling path predicter 210 can calculate a first steering angle α of the first front wheel by dividing a steering angle of the steering wheel by the first steering ratio, and a second steering angle β of the second front wheel by dividing the steering angle of the steering wheel by the second steering ratio.

Then, the vehicle traveling path predicter 210 can calculate a first radius Rfl of the first front wheel (left front wheel, A) and a second radius Rfr of the second front wheel (right front wheel, B) using Equation 1 described above, and calculate a turning radius Rf through a mathematical algorithm based on the first radius Rfl and the second radius Rfr that are input to the mathematical algorithm.

The turning radius finally calculated using the first radius Rfl and the second radius Rfr may refer to a radius around a center position (not shown) of a front wheel shaft to which the two front wheels A and B are connected.

In this case, since a relationship between the first radius Rfl and the second radius Rfr does not vary linearly unlike a relationship between multiple radii calculated based on rear wheels, which will be described below in further detail, the radius around the center position of the front wheel shaft can be calculated using a relatively complex mathematical algorithm (e.g., similarity ratio, etc.).

Further, in the case of a vehicle turning at a low speed, a turning radius calculated based on front wheels may cause some errors in determining a probability of a potential collision.

In this case, the vehicle traveling path predicter 210 can calculate a turning radius of at least one rear wheel of the vehicle.

In one embodiment, the vehicle traveling path predicter 210 can calculate a steering angle of at least one front wheel by dividing a steering angle of the steering wheel by a steering ratio. Thereafter, the vehicle traveling path predicter 210 can calculate a turning radius Rf by substituting the steering angle of the front wheel and a first distance between wheel shafts stored in advance into Equation 2 below.

$$R_r = \frac{L}{\tan\theta_W}, \theta_W = \frac{\theta_{SW}}{r} \quad [\text{Equation 2}]$$

Here, L is a first distance between wheel shafts, $\theta_W$ is a steering angle of a front wheel, $\theta_{SW}$ is a steering angle of a steering wheel, and r is a steering ratio.

As described above, since the vehicle modeling includes multiple front wheels, the vehicle traveling path predicter 210 can finally calculate one turning radius serving as a reference based on multiple turning radii calculated based on rear wheels.

That is, based on the vehicle modeling, the vehicle traveling path predicter 210 can calculate respective steering angles of multiple rear wheels based on multiple steering ratios stored in advances and the steering angle of the steering wheel, calculate respective radii of the multiple rear wheels included in the vehicle modeling using the respective steering angles of the multiple rear wheels and the first distance between wheel shafts, and calculate a turning radius by averaging the calculated radii.

More specifically, referring to FIG. 3, in the same manner as described above, the vehicle traveling path predicter 210 can store the first steering ratio and the second steering ratio in advance, and calculate the first steering angle α and the second steering angle β.

Thereafter, the vehicle traveling path predicter 210 can calculate a first radius Rrl of a first rear wheel (left rear wheel, D) and a second radius Rrr of a second rear wheel (right rear wheel, C) using Equation 2 described above, and calculate a turning radius Rr by averaging ((Rrl−Rrr)/2) the first radius Rrl and the second radius Rrr.

The turning radius finally calculated using the first radius Rrl and the second radius Rrr may refer to a radius around a center position (Pcenter) of a rear wheel shaft to which the two rear wheels C and D are connected. Since a distance between the center position (Pcenter) of the rear wheel shaft and the center (0) of the circle is an intermediate value between the first radius Rrl and the second radius Rrr, therefore, the calculation of the turning radius based on the rear wheels is performed faster than that of the turning radius based on the front wheels.

As described above, the vehicle control device according to aspects of present disclosure can provide an effect of predicting a traveling path more accurately by calculating a turning radius with respect to at least one wheel or tire contacting a road surface in an environment with a low probability of slipperiness.

Further, the vehicle control device according to aspects of present disclosure can provide an effect of maximizing a calculation speed and minimizing power consumption by calculating a turning radius based on rear wheels for a vehicle traveling at a low speed.

Meanwhile, as another example of the dynamic modeling of a vehicle, there is provided the bicycle modeling that is simpler than the vehicle modeling. Hereinafter, embodiments of calculating a turning radius using the bicycle modeling will be described in detail.

Figure 4:
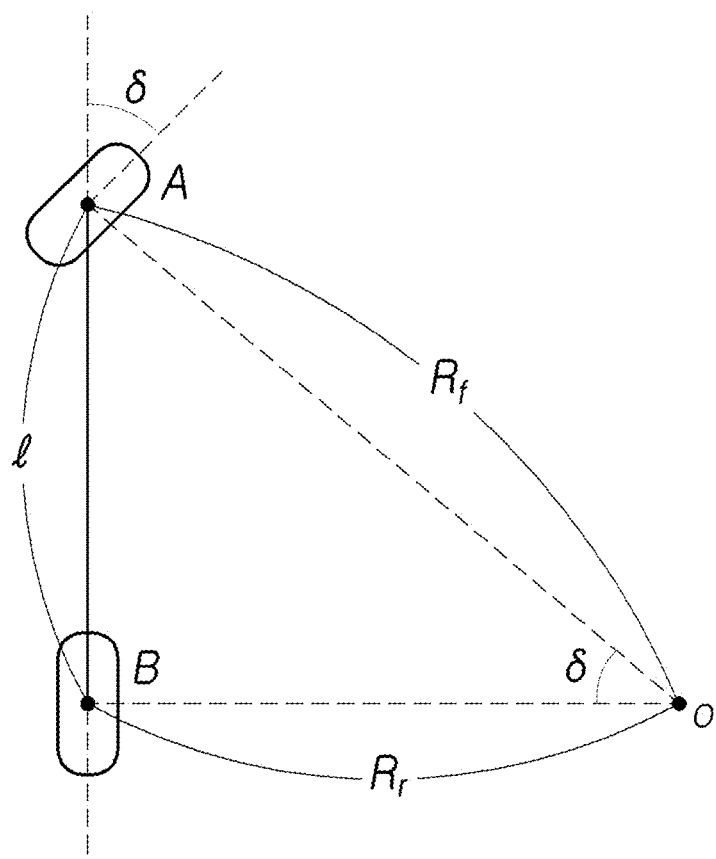
FIG. 4 illustrates another example of calculating a turning radius in the vehicle control device and/or system according to aspects of the present disclosure.

FIG. 4 illustrates another example of calculating a turning radius in the vehicle control device and/or system according to aspects of the present disclosure.

Referring to FIG. 4, the bicycle modeling according to embodiments of the present disclosure may include one front wheel A, one rear wheel B, and a second distance ℓ between wheel shafts. Here, the second distance ℓ between wheel shafts may correspond to the first distance L between wheel shafts shown in FIG.

As described above with reference to FIG. 3, the vehicle traveling path predicter 210 can calculate a steering angle δ of the front wheel A using a steering angle of the steering wheel and a steering ratio, and a turning radius using the steering angle δ of the front wheel A and the second distance ℓ between wheel shafts.

Here, in the same manner as described above, the turning radius may be calculated based on the front wheel or the rear wheel.

In one embodiment, based on the front wheel, the vehicle traveling path predictor 210 can store in advance a steering ratio r corresponding to the front wheel A included in the bicycle modeling based on the bicycle modeling. Here, the steering ratio r may be calculated by dividing the steering angle $\theta_{SW}$ of the steering wheel by an average $((\alpha-\beta)/2)$ of the first steering angle $\alpha$ of the first front wheel and the second steering angle $\beta$ of the second front wheel based on the vehicle modeling shown in FIG. 3.

Further, the vehicle traveling path predictor 210 can calculate a steering angle $\delta$ of the front wheel A by dividing the steering angle $\theta_{SW}$ of the steering wheel by the steering ratio r, and calculate a turning radius Rf by substituting the steering angle $\delta$ and the second distance $\ell$ between wheel shafts into Equation 1 described above.

In another embodiment, based on the rear wheel, as described above, the vehicle traveling path predictor 210 can calculate a turning radius Rr by substituting the steering angle $\delta$ of the front wheel A and the second distance $\ell$ between wheel shafts into Equation 2 described above.

The turning radius Rf calculated based on the front wheel A of the bicycle modeling shown in FIG. 4 may be the same as the turning radius calculated based on the center position (not shown) of the front wheel shaft of the vehicle modeling shown in FIG. 3.

Further, the turning radius Rr calculated based on the rear wheel B of the bicycle modeling shown in FIG. 4 may be the same as the turning radius calculated based on the center position (Pcenter) of the rear wheel shaft of the vehicle modeling shown in FIG. 3.

Preferably, in the case of low-speed driving, the vehicle traveling path predictor 210 can predict a traveling path of the vehicle using a turning radius Rr calculated based on at least one rear wheel, and in the case of non-low-speed driving, the vehicle traveling path predictor 210 can predict a traveling path of the vehicle using a turning radius Rf calculated based on at least one front wheel.

Accordingly, as described above, the vehicle control device 200 according to aspects of the present disclosure can provide an effect of accurately predicting a traveling path by using a turning radius calculated by the method capable of minimizing a potential error according to a vehicle speed.

Hereinafter, embodiments of predicting a traveling path using a calculated turning radius and a traveling distance will be described. For convenience of description, discussions will be given based on the bicycle modeling as shown in FIG. 4 and a turning radius calculated based on the rear wheel.

Figure 5:
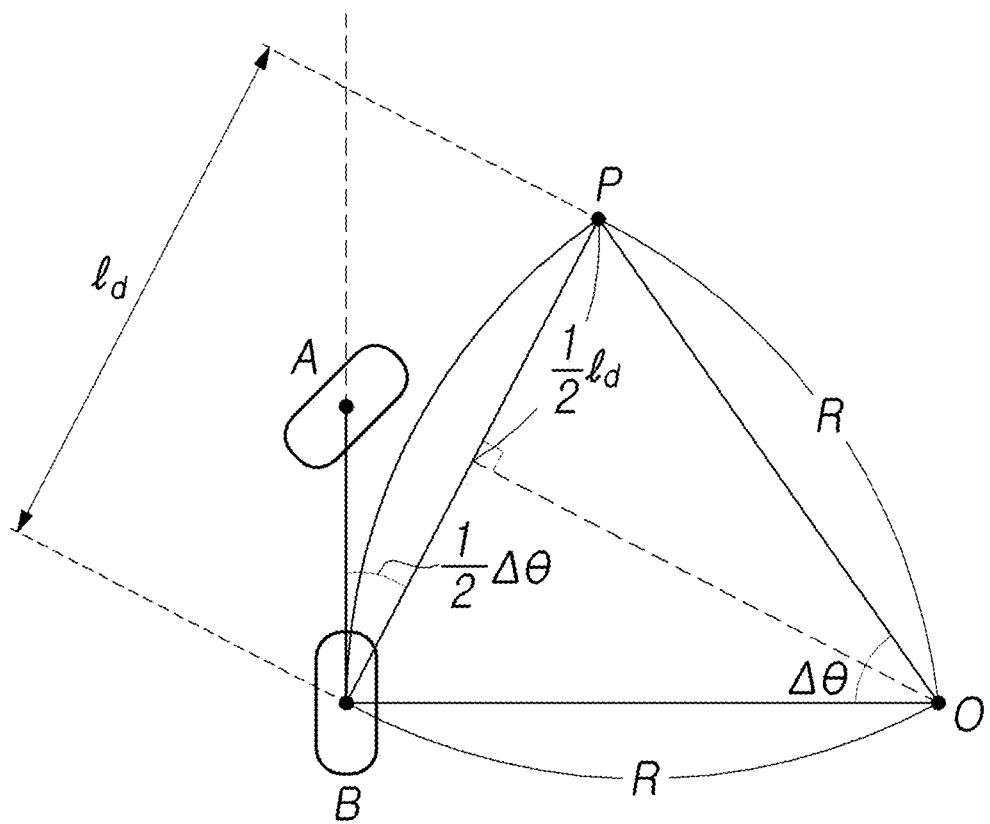
FIG. 5 illustrates an example of predicting a traveling path of a vehicle in the vehicle control device and/or system according to aspects of the present disclosure.

FIG. 5 illustrates an example of predicting a traveling path of a vehicle in the vehicle control device and/or system according to aspects of the present disclosure.

Referring to FIG. 5, the vehicle traveling path predictor 210 can calculate a traveling distance S based on at least one of a vehicle speed of a vehicle and a pulse signal of at least one wheel.

Here, the traveling distance S may refer to a distance by which the vehicle has actually traveled as the vehicle turns. In this case, the traveling distance S may be calculated from constant periodic signals, or data.

In one embodiment, when the vehicle speed sensor 112 outputs vehicle speed information to the vehicle control device 200 at a cycle of 20 ms, and the vehicle speed indicated by the vehicle speed information is 10 kph, it may be determined that the vehicle has traveled by 55 mm for 20 ms as the traveling distance S. However, embodiments of the present disclosure are not limited thereto.

As another embodiment, in a situation where a wheel pulse sensor outputs one or more pulses, each of which indicates a traveling distance of 2 cm, to the vehicle control device 200, and one pulse has been generated for 20 ms, it may be determined that the traveling distance S is 2 cm for 20 ms. However, embodiments of the present disclosure are not limited thereto.

When the turning radius R and the traveling distance S are calculated, the vehicle traveling path predictor 210 can calculate a heading angle $\Delta\theta$ of the vehicle using the turning radius R and the traveling distance S.

Specifically, the vehicle traveling path predictor 210 can calculate the heading angle of the vehicle by substituting the turning radius R and the traveling distance S into Equation 3.

$$\Delta\theta = \frac{S}{R} \qquad \text{[Equation 3]}$$

This is because the traveling distance (S) has the property of an arc formed by the radius R and the angle $\Delta\theta$.

When the heading angle $\Delta\theta$ of the vehicle is calculated, the vehicle traveling path predictor 210 can calculate a traveling displacement $\ell$ d of the vehicle based on the turning radius R and the heading angle $\Delta\theta$.

The traveling displacement $\ell$ d may mean a linear distance between a starting point and another point to which the vehicle travels from the starting point by the traveling distance S, and may be a length of a chord in a sector shape formed by the turning radius R, the heading angle $\Delta\theta$, and the traveling distance S which is an arc.

Specifically, the vehicle traveling path predictor 210 can calculate the traveling displacement $\ell$ d by substituting the turning radius R and the heading angle $\Delta\theta$ into Equation 4.

$$\ell_d = 2 \cdot R \cdot \sin\left(\frac{1}{2}\Delta\theta\right) \qquad \text{[Equation 4]}$$

When the traveling displacement $\ell$ d is calculated, the vehicle traveling path predictor 210 can predict a first traveling path of the vehicle based on the heading angle $\Delta\theta$ and the traveling displacement $\ell$ d.

Here, the first traveling path of the vehicle may be expressed as a trajectory of coordinates P($\Delta$x, $\Delta$y) measured while the vehicle travels.

In this case, the coordinates P($\Delta$x, $\Delta$y) may be determined by Equation 5 below.

$$\Delta x = \ell_d \cdot \sin\left(\theta_0 - \frac{1}{2}\Delta\theta\right) \qquad \text{[Equation 5]}$$
$$\Delta y = \ell_d \cdot \cos\left(\theta_0 - \frac{1}{2}\Delta\theta\right)$$

Here, $\theta 0$ denotes an initial heading angle of the vehicle, or a heading angle before traveling.

The vehicle traveling path predictor 210 can predict the first traveling path by predicting a trajectory of the determined coordinates P($\Delta$x, $\Delta$y).

In the case of the vehicle modeling, since the traveling distance S can be calculated such that a traveling distance with respect to the center position (Pcenter) of the rear wheel shaft is calculated by calculating respective traveling distances (e.g., a traveling distance S1 of the left rear wheel is Ar*θ; a traveling distance S2 of the right rear wheel is Br*θ; Ar is a turning radius of the left rear wheel; Br is a turning radius of the right rear wheel; and θ is a heading angle) of the two rear wheels C and D using the pulse or vehicle speed information described above, and calculating an average of the calculated traveling distances, the vehicle traveling path predictor 210 can predict the first traveling path using the turning radius, the traveling distance, and the heading angle with respect to the central position (Pcenter) of the rear wheel shaft.

Meanwhile, in order for the vehicle control device 200 according to aspects of the present disclosure to determine the probability of a potential collision between the vehicle and a target, it is necessary to identify the target and predict a traveling path of the target. Hereinafter, embodiments of predicting a traveling path of a target will be described in detail.

Figure 6:
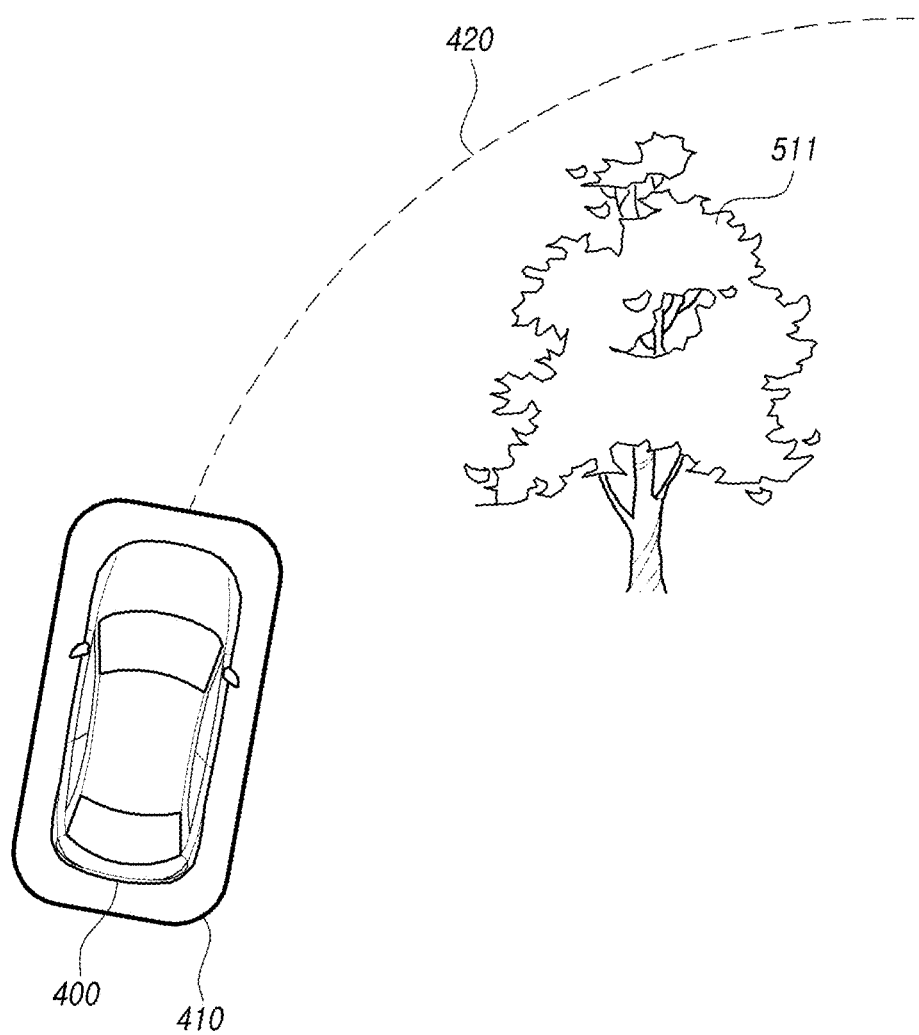
FIG. 6 illustrates an example of predicting a traveling path of a target based on a type of the target in the vehicle control device and/or system according to aspects of the present disclosure.

FIG. 6 illustrates an example of predicting a traveling path of a target based on a type of the target in the vehicle control device and/or system according to aspects of the present disclosure. FIG. 7 illustrates another example of predicting a traveling path of a target based on a type of the target in the vehicle control device and/or system according to aspects of the present disclosure.

The target traveling path predictor 220 220 according to embodiments of the present disclosure can identify types of target, and predict a second traveling path according to the identified types. That is, the target traveling path predictor 220 can determine whether to predict the second traveling path by identifying types of target.

This is to prevent unnecessary calculation processing as in a case where the prediction of the second traveling path of a target is not required when the target is an immovable object such as a guard rail, a power pole, and the like.

Here, for identifying types of target, various methods may be employed. In one embodiment, the target traveling path predictor 220 can extract a target from image data captured by a camera, and identify a type of the target through a machine learning algorithm using the extracted target as an input. However, embodiments of the present disclosure are not limited thereto.

That is, when the target is an immovable object, the target traveling path predictor 220 can determine that the prediction of the second traveling path is not required.

Referring to FIG. 6, for example, when it is determined that the target is a street tree 511 by the target traveling path predictor 220, the target traveling path predictor 220 can determine that the prediction of the second traveling path is not required.

When a target is a movable object, the target traveling path predictor 220 can predict a second traveling path by detecting a traveling speed of the target based on object detection information from one or more object detection sensors 113, and the like.

Even if the target is a movable object, the detection of the traveling speed of the target may be needed considering a case where the target may be stationary.

Here, for detecting the traveling speed, various methods may be employed. In one embodiment, a difference between images with respect to an equal object contained in the images acquired by a camera can be determined, and thereafter, a traveling speed of the object can be detected based on the difference between the images. In another embodiment, since a radar can directly detect a traveling speed of a target (using the Doppler effect, etc.), after measuring the traveling speed of the target, the radar can provide object detection information containing the traveling speed to the vehicle control device 200, and thereby, the target traveling path predictor 220 can extract the traveling speed of the target from the object detection information.

In this situation, the target traveling path predictor 220 can predict a second traveling path by identifying a traveling direction of the target according to the traveling speed of the target.

Figure 7:
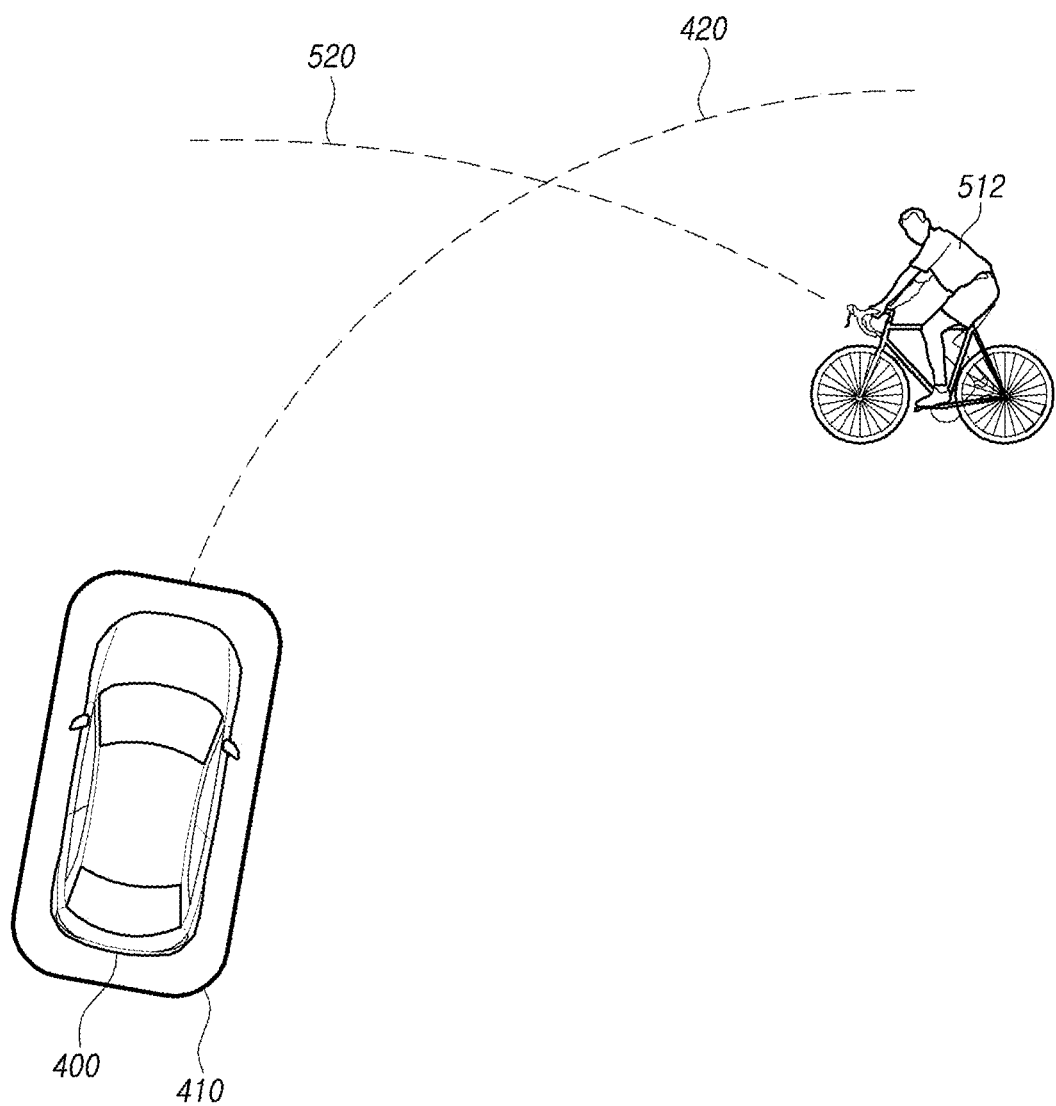
FIG. 7 illustrates another example of predicting a traveling path of a target based on a type of the target in the vehicle control device and/or system according to aspects of the present disclosure.

Referring to FIG. 7, for example, when it is determined that the target is a person riding a bicycle 512 by the target traveling path predictor 220, the target traveling path predictor 220 can predict a second traveling path based on a traveling speed of the person riding the bicycle 512.

As described above, the vehicle control device 200 according to aspects of the present disclosure can provide an effect of quickly processing information by preventing unnecessary calculations and simplifying calculation processing.

The collision probability determiner 230 can determine a probability of a potential collision according to whether a collision determination boundary region 410 is overlaid with the target at a specific time. In this regard, even if the target is a movable target, criteria or conditions for determine the probability of the potential collision may be differently set according to specific types of target.

Hereinafter, embodiments of modifying a collision determination boundary region 410 in order to set collision probability determination criteria differently will be described in detail.

Figure 8:
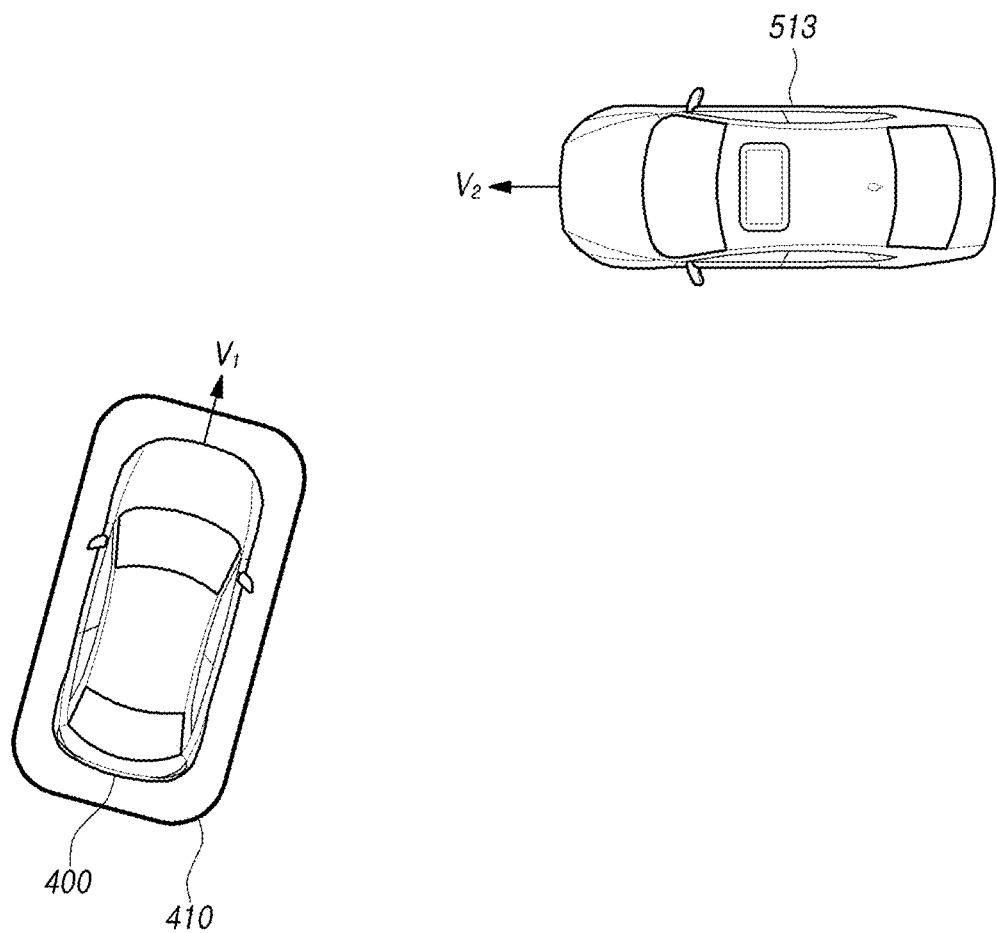
FIG. 8 illustrates an example of modifying a size of a collision determination boundary region based on a type of target in the vehicle control device and/or system according to aspects of the present disclosure.
Figure 9:
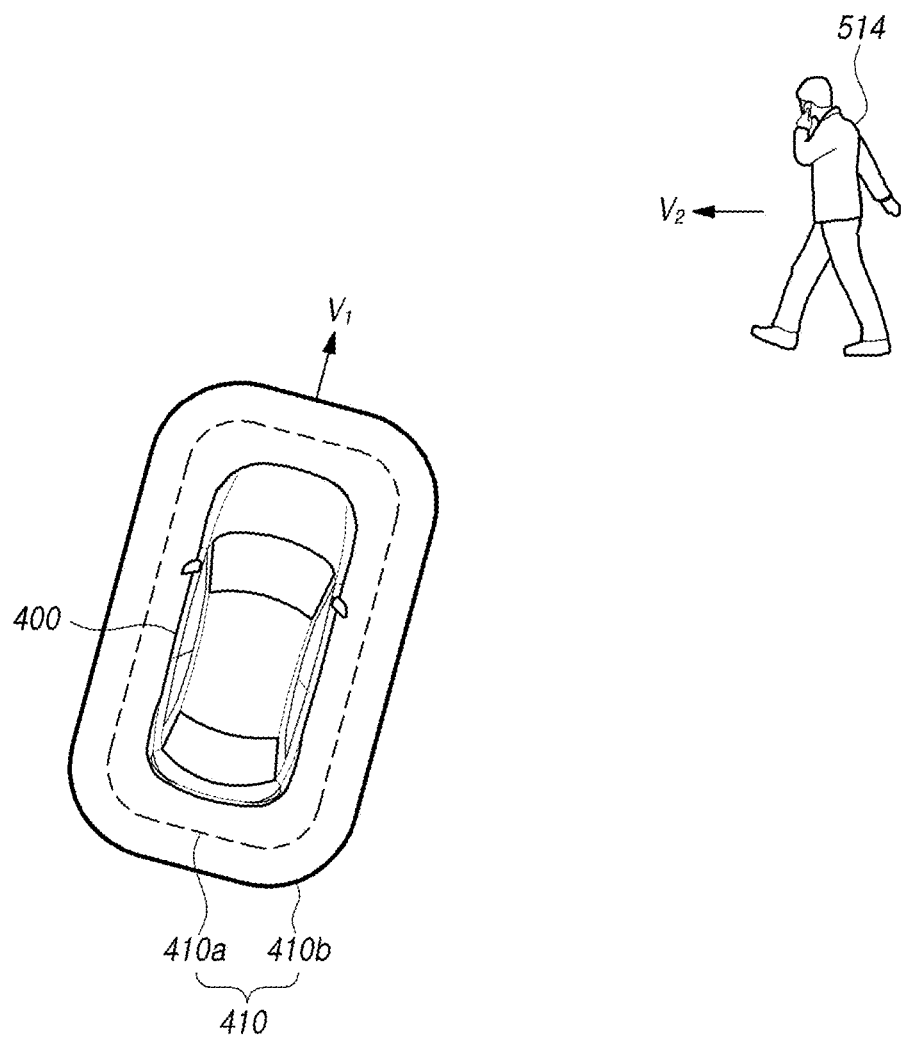
FIG. 9 illustrates another example of modifying a size of a collision determination boundary region based on a type of target in the vehicle control device and/or system according to aspects of the present disclosure.

FIG. 8 illustrates an example of modifying a size of a collision determination boundary region based on a type of target in the vehicle control device and/or system according to aspects of the present disclosure. FIG. 9 illustrates another example of modifying a size of a collision determination boundary region based on a type of target in the vehicle control device and/or system according to aspects of the present disclosure.

The target traveling path predictor 220 can provide type information indicating a target type according to the identified type of target to the collision probability determiner 230, and thereby, the collision probability determiner 230 can correct or modify a size of a collision determination boundary region 410 based on the target type.

Referring to FIG. 8, for example, when the target is another vehicle 513, the target traveling path predictor 220 can provide type information indicating that the target is another vehicle 513 to the collision probability determiner 230. When it is determined that the target is another vehicle 513, the collision probability determiner 230 can set a collision determination boundary region 410 to have nearly, or approximately, the same size as the corresponding vehicle 513.

As another vehicle 513 generally includes an avoidance system, a warning system, and the like, the degree of the probability of a potential collision may be relatively lower than that of a pedestrian 514 that is described below.

Referring to FIG. 9, when the target is a pedestrian 514, the degree of the probability of a potential collision with the pedestrian 514 may be relatively high, unlike the degree of the probability of the potential collision with another vehicle 513. That is, if the target is the pedestrian 514, the collision probability determiner 230 can increase a size of the collision determination boundary region 410*a* by a predetermined size as shown by reference 410*b*.

That is, the collision probability determiner 230 can change a collision determination boundary region according to types of target. For example, a size of a collision determination boundary region may be adjusted according to a size of a detected target. In this case, the size of the collision determination boundary region may be adjusted in proportion, or inverse proportion, to the size of the detected target. It can be understood that the size of the collision determination boundary region may not be reduced below a minimum collision determination boundary region where a certain level of tolerance is applied to a size of a vehicle, and not be increased over a maximum collision determination boundary region.

As described above, the vehicle control device 200 according to aspects of the present disclosure can protect other vehicles or pedestrians present outside, as well as occupants of the vehicle 400, by differently setting collision probability criteria according to types of target.

Meanwhile, since targets may be deformed according to various causes such as aging, damage, etc., and various types of target are present, if data stored in advance in the vehicle control device 200 cannot be updated, an error may occur in identifying types of target.

In this case, it is necessary to adjust the size of the collision determination boundary region 410 even without distinguishing types of target.

Hereinafter, embodiments of modifying a size of a collision determination boundary region 410 based on a shape of a target will be described in detail.

Figure 10:
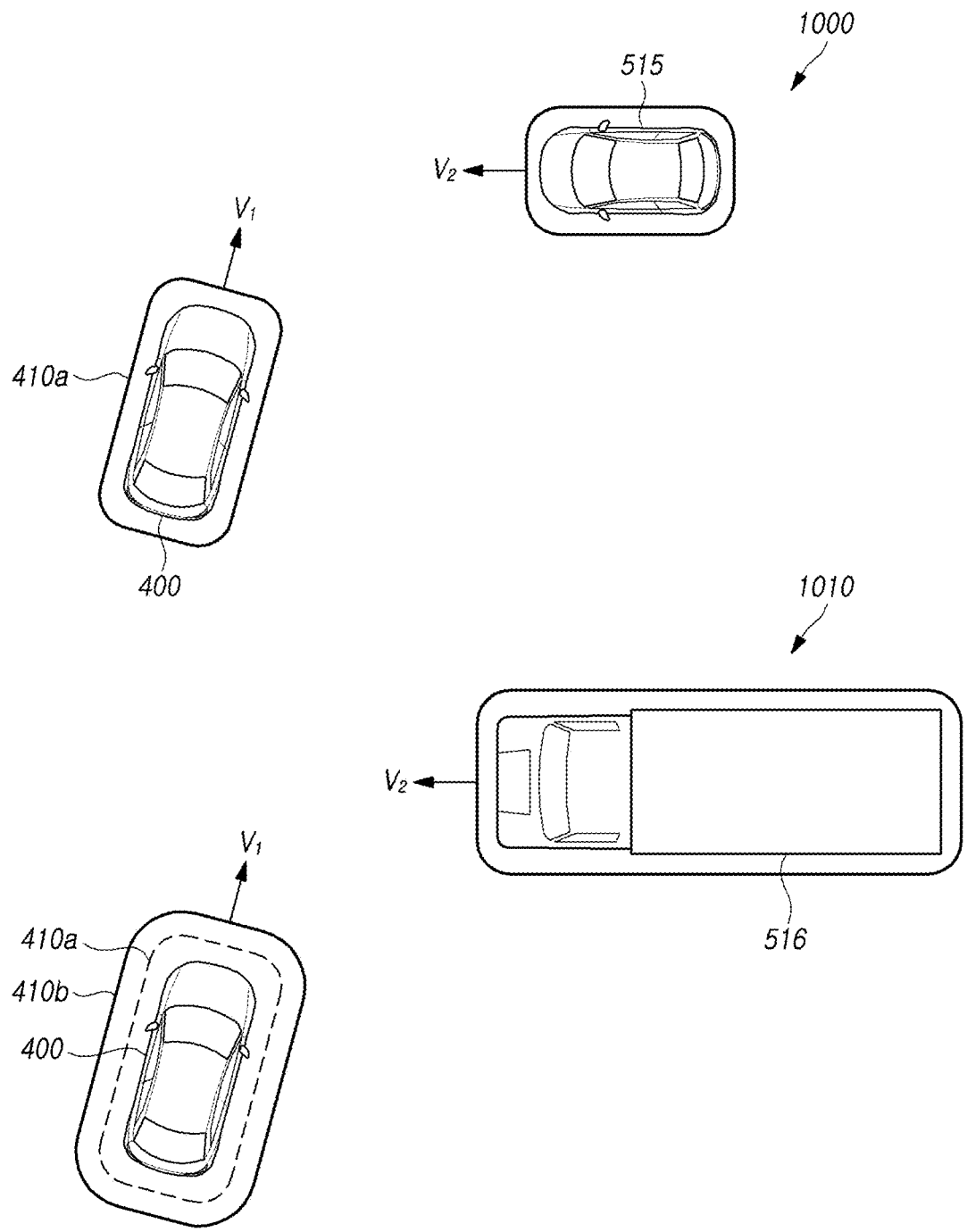
FIG. 10 illustrates an example of modifying a size of a collision determination boundary region based on a shape of a target in the vehicle control device and/or system according to aspects of the present disclosure.

FIG. 10 illustrates an example of modifying a size of a collision determination boundary region based on a shape of a target in the vehicle control device and/or system according to aspects of the present disclosure.

Referring to FIG. 10, the target traveling path predictor 220 can specify a shape of a target based on object detection information from one or more object detection sensors, and output shape information indicating the shape of the specified target to the collision probability determiner 230. In this situation, the collision probability determiner 230 can modify a size of a collision determination boundary region 410a based on the shape.

Here, for specifying a shape of a target, various methods may be employed. In one embodiment, the target traveling path predictor 220 can specify a shape of a target by setting a region of interest (ROI). As another embodiment, the target traveling path predictor 220 can specify a shape of a target present in an image acquired from the camera by using a feature point extract ion algorithm, such as Scale Invariant Feature Transform (SIFT), Speeded Up Robust Features (SURF) and the like. However, embodiments of the present disclosure are not limited thereto.

Meanwhile, as a size of a target determined based on a shape of the target increases, a size of a corresponding collision determination boundary region 410a may be increased.

Referring to a situation shown by reference 1000 in FIG. 10, for example, when a target is a small car 515, a size of the small car 515 is smaller than that of a normal vehicle 400, therefore, the collision probability determiner 230 may set a size of a corresponding collision determination boundary region 410a to be equal, or nearly or approximately equal, to that of the vehicle 400.

Referring to a situation shown by reference 1010 in FIG. 10, for example, when a target is a truck 516, a size of the truck 516 is larger than that of the vehicle 400, therefore, the collision may set a size of a corresponding collision determination boundary region 410a to be greater than that of the vehicle 400.

Although not shown, a size of the collision determination boundary region 410a may be adjusted according to a traveling speed of a target.

As described above, the vehicle control device 200 according to aspects of the present disclosure can provide an effect of efficiently preventing vehicle accidents by setting different collision probability determination criteria or conditions even without considerations for types of target.

Meanwhile, when the vehicle 400 travels at a high speed, the probability of a collision between the vehicle 400 and the target may be high, therefore, it may be necessary to set collision probability determination criteria or conditions differently according to a vehicle speed of the vehicle 400. For example, a size of a collision determination boundary region may be adjusted according to, or in proportion to, a vehicle speed.

Figure 11:
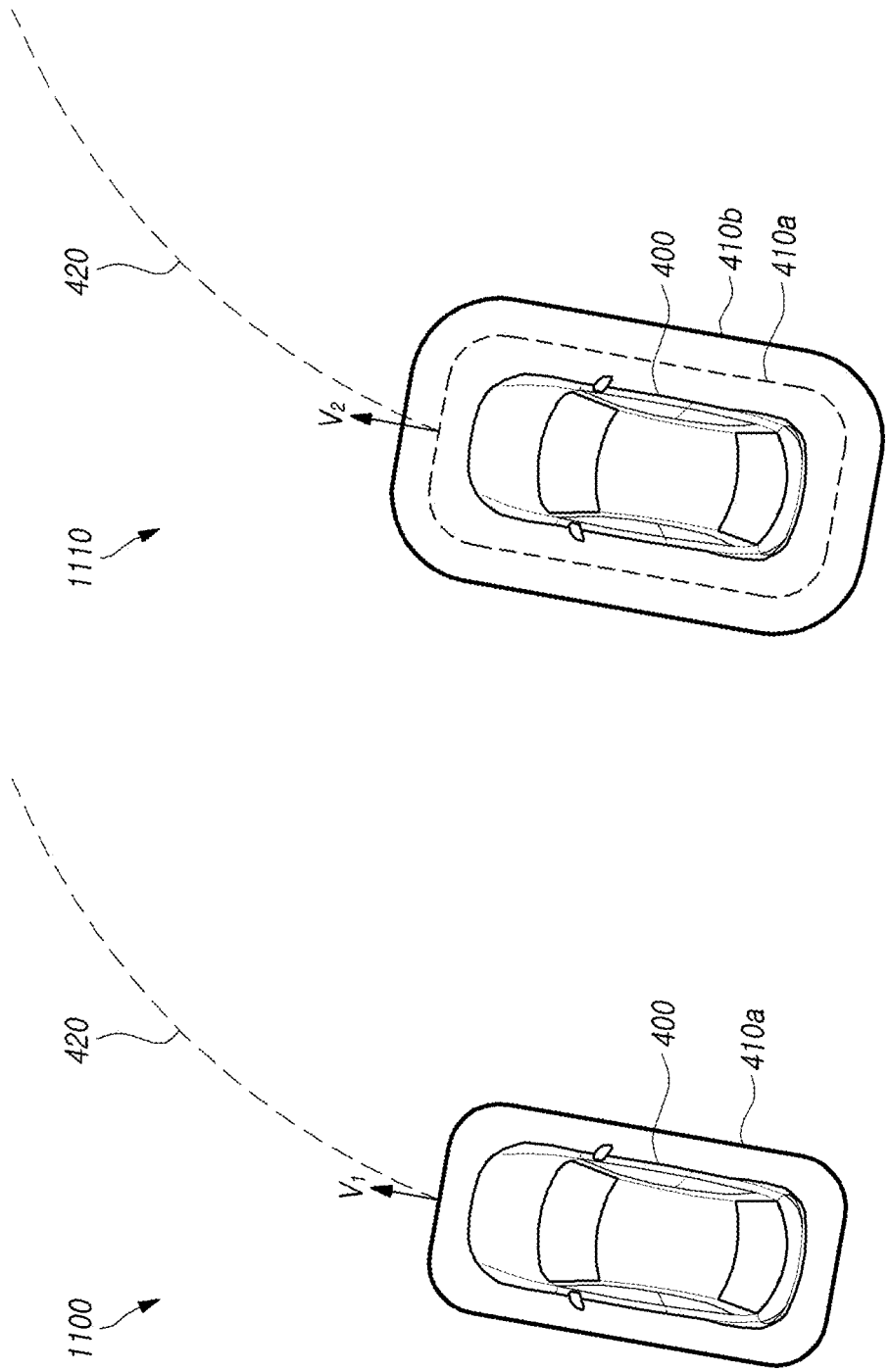
FIG. 11 illustrates an example of modifying a size of a collision determination boundary region based on a vehicle speed of a vehicle in the vehicle control device and/or system according to aspects of the present disclosure.

FIG. 11 illustrates an example of modifying a size of a collision determination boundary region based on a vehicle speed of a vehicle in the vehicle control device and/or system according to aspects of the present disclosure.

Referring to FIG. 11, the collision probability determiner 230 can compare a vehicle speed with a reference vehicle speed set in advance, and modify a size of a corresponding collision determination boundary region 410a according to a result of the comparison.

In this situation, if the vehicle speed is equal to or greater than the reference vehicle speed, the collision probability determiner 230 can increase the size of the collision determination boundary region 410a. Here, the reference vehicle speed may refer to a reference for determining whether the vehicle 400 travels at a high speed.

Referring to a situation shown by reference 1100 in FIG. 11, for example, when a vehicle speed is less than the reference vehicle speed, the collision probability determiner 230 can set a size of a collision determination boundary region 410a to be equal, or nearly or approximately equal, to the size of the vehicle 400. That is, when the vehicle speed is less than the reference vehicle speed, the size of the collision determination boundary region 410a may not be changed.

In contrast, referring to a situation shown by reference 1110 in FIG. 11, when a vehicle speed is equal to or greater than the reference vehicle speed, the collision probability determiner 230 may uniformly change a size of a collision determination boundary area 410a according to a modification degree or level set in advance or may set it to be increased according to the vehicle speed as shown by reference 410b. That is, the collision probability determiner 230 can increase a size of a collision determination boundary region 410a based on a level or value of a vehicle speed.

For example, the size of the collision determination boundary region 410a may be increased according to, or in proportion to, an increasing level or rate of the vehicle speed. However, embodiments of the present disclosure are not limited thereto.

As described above, the vehicle control device 200 according to aspects of the present disclosure can provide an effect of efficiently preventing vehicle accidents by setting different collision probability determination criteria or conditions according to speeds of vehicles.

When the collision determination boundary region 410 is finally determined, the collision probability determiner 230 can determine the possibility of a potential collision between the vehicle 400 and the target based on the collision determination boundary region 410.

Figure 12:
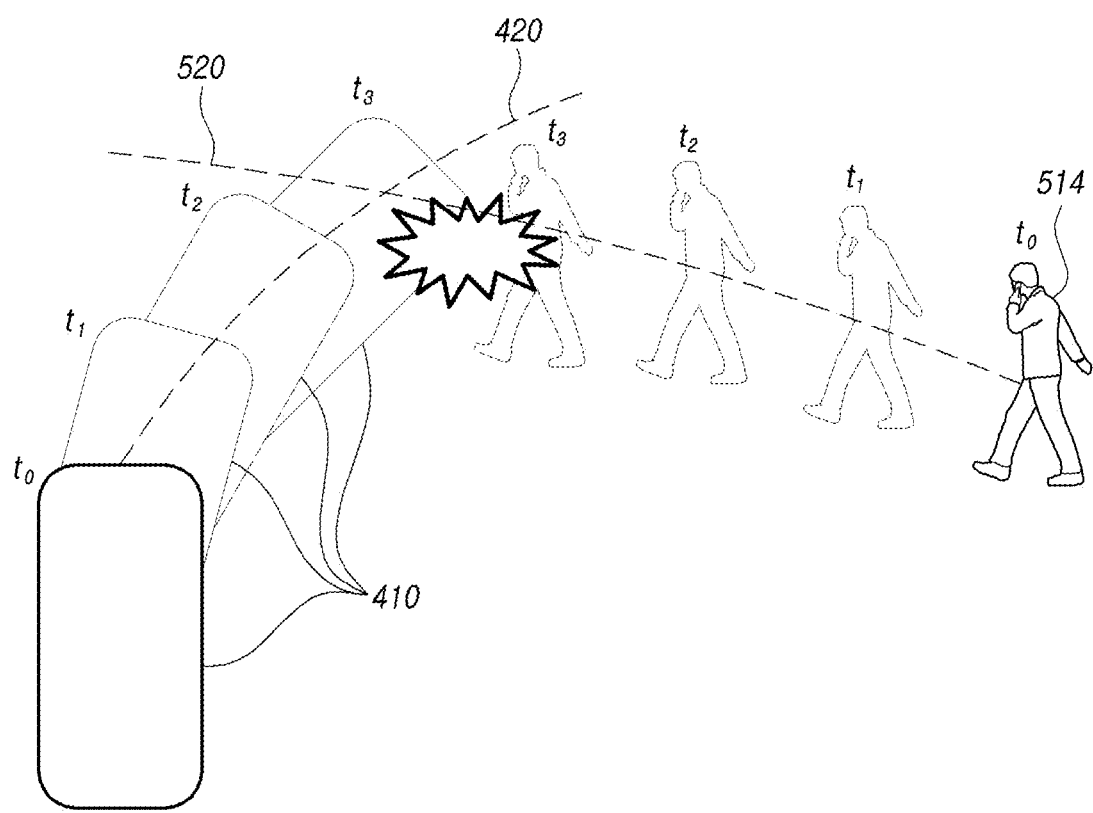
FIGS. 12 and 13 illustrate examples of determining the probability of a potential collision between a vehicle and a target in the vehicle control device and/or system according to aspects of the present disclosure.
Figure 13:
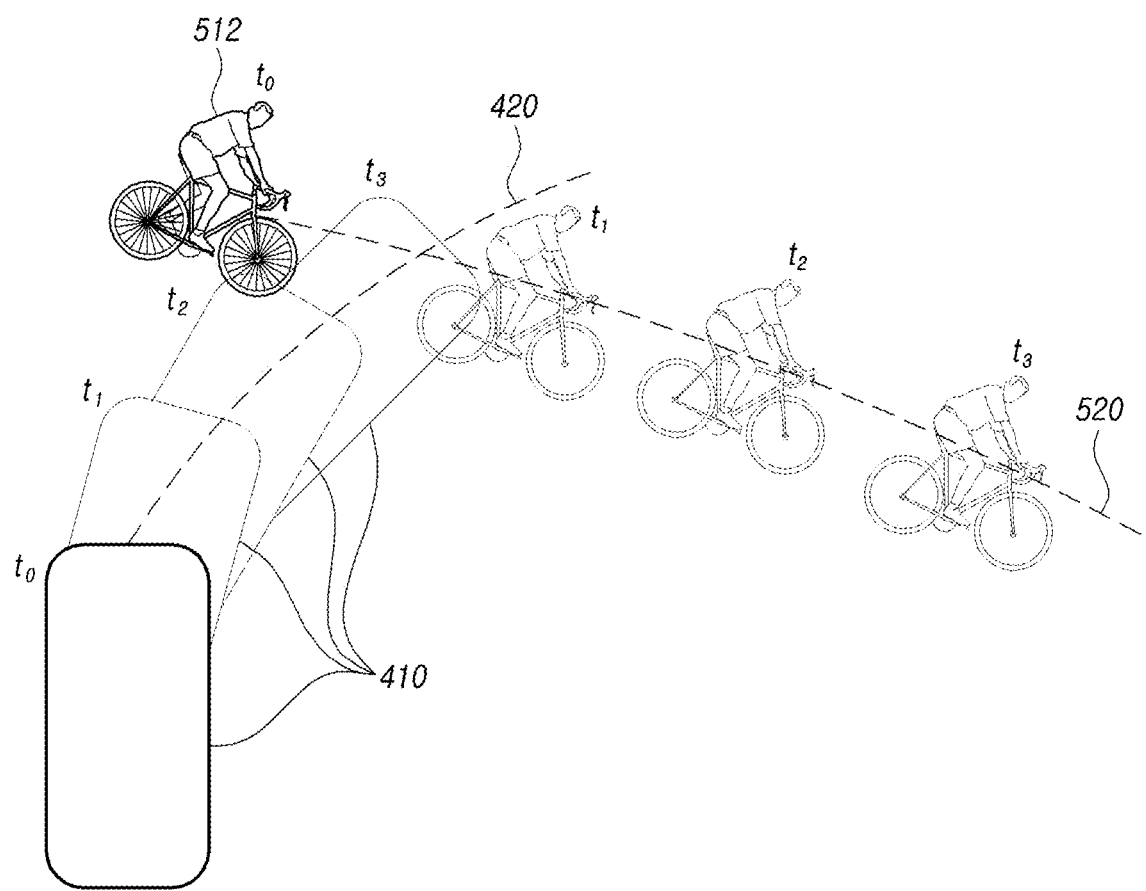

FIGS. 12 and 13 illustrate examples of determining the probability of a potential collision between a vehicle and a target in the vehicle control device and/or system according to aspects of the present disclosure.

Based on the time when the target is identified, the collision probability determiner 230 can determine the probability of a potential collision based on whether a collision determination boundary region 410 moving on a first traveling path is overlaid with the target traveling on a second traveling path.

That is, by regarding the time when the target is identified as a reference time and measuring a length of time from the reference time, the probability of the potential collision can be determined based on whether the collision determination boundary region 410 which is moved together with the traveling of the vehicle 400 is overlaid with the target at a specific time.

Specifically, the collision probability determiner 230 can measure each of a first predicted position of the vehicle 400 present on the first traveling path and a second predicted position of the target present on the second traveling path every unit time set in advance, and when a collision determination boundary region 410 at the first predicted position and the target at the second predicted position, which are predicted at a specific time, are overlaid with each other, it may be determined that the probability of a potential collision is present.

Referring to FIG. 12, for example, by measuring a length of time from the time, t0, when a target (e.g., a pedestrian 514) is identified, the collision probability determiner 230 can measure a first predicted position and a second predicted position every unit time (t1, t2, t3) set in advance. Further, when it is determined that a collision determination boundary region 410 is overlaid with the target at a specific time, t3, the collision probability determiner 230 can determine that the probability of a potential collision is present.

In another example, with reference to FIG. 13, by measuring a length of time from the time, t0, when a target (e.g., bicycle 512) is identified, the collision probability determiner 230 can predict a first predicted position and a second predicted position, and when it is determined that a collision determination boundary region 410 and the target are not overlaid with each other, can determine that the probability of a potential collision is not present.

As described above, the vehicle control device 200 according to aspects of the present disclosure provides an effect of more accurately determining the probability of a potential collision by using a collision determination boundary region 410 adjustable according to a size of the vehicle 400.

Further, the vehicle control device 200 according to aspects of the present disclosure provides an effect of accurately determining the probability of a potential collision by predicting a traveling path that more matches an actual traveling direction of a vehicle 400 comparing with a situation where a yaw rate sensor, and the like are used.

Hereinafter, a vehicle control method capable of performing all or some of the embodiments described herein of the present disclosure will be described.

Figure 14:
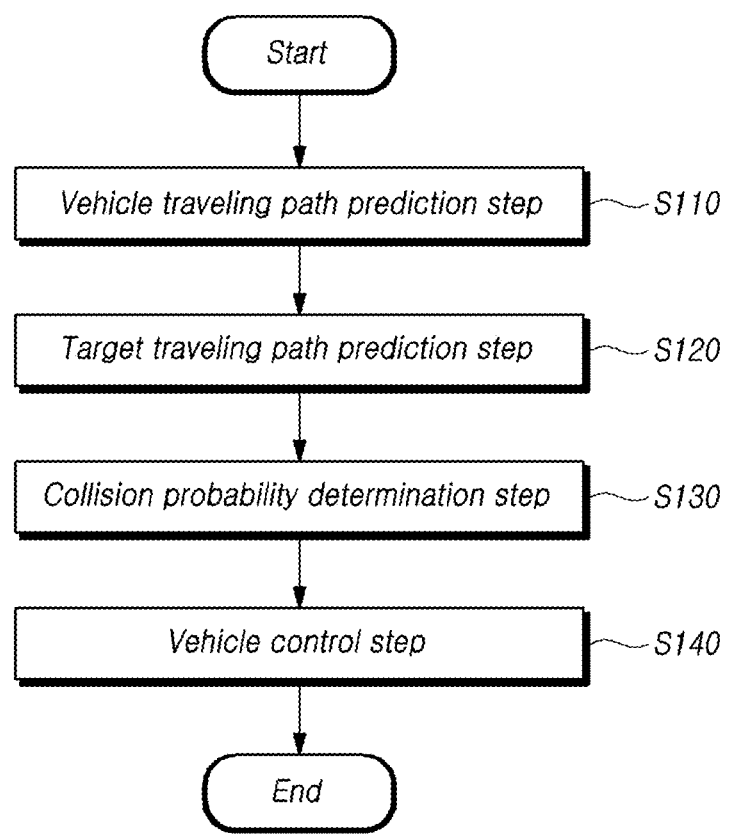
FIG. 14 is a flow diagram illustrating a vehicle control method according to aspects of the present disclosure.

FIG. 14 is a flow diagram illustrating a vehicle control method according to aspects of the present disclosure.

Referring to FIG. 14, the vehicle control device 200 according to aspects of the present disclosure may include a vehicle traveling path prediction step S110, a target traveling path prediction step S120, a collision probability determination step S130, a vehicle control step S140, and the like.

In the vehicle traveling path prediction step S110, when a vehicle speed is less than or equal to a preset speed, a turning radius can be calculated based on a steering angle of a steering wheel and a steering ratio of a vehicle 400; and a traveling distance can be calculated based on the vehicle speed; and a first traveling path of the vehicle 400 can be predicted based on the turning radius and the traveling distance.

In the target traveling path prediction step S120, a target can be identified based on object detection information acquired by detecting situations or objects present in the vicinity of the vehicle 400, and a second traveling path of the target can be predicted.

In the collision probability determination step S130, a collision determination boundary region 410 corresponding to a size of the vehicle 400 can be set, and the probability of a potential collision of the vehicle 400 can be determined based on the collision determination boundary region 410, the first traveling path, the target, and the second traveling path.

In the vehicle control step S140, when the probability of a potential collision between the vehicle and the target is present, at least one of a warning control, a braking control, and an avoidance control can be controlled to be performed.

Figure 15:
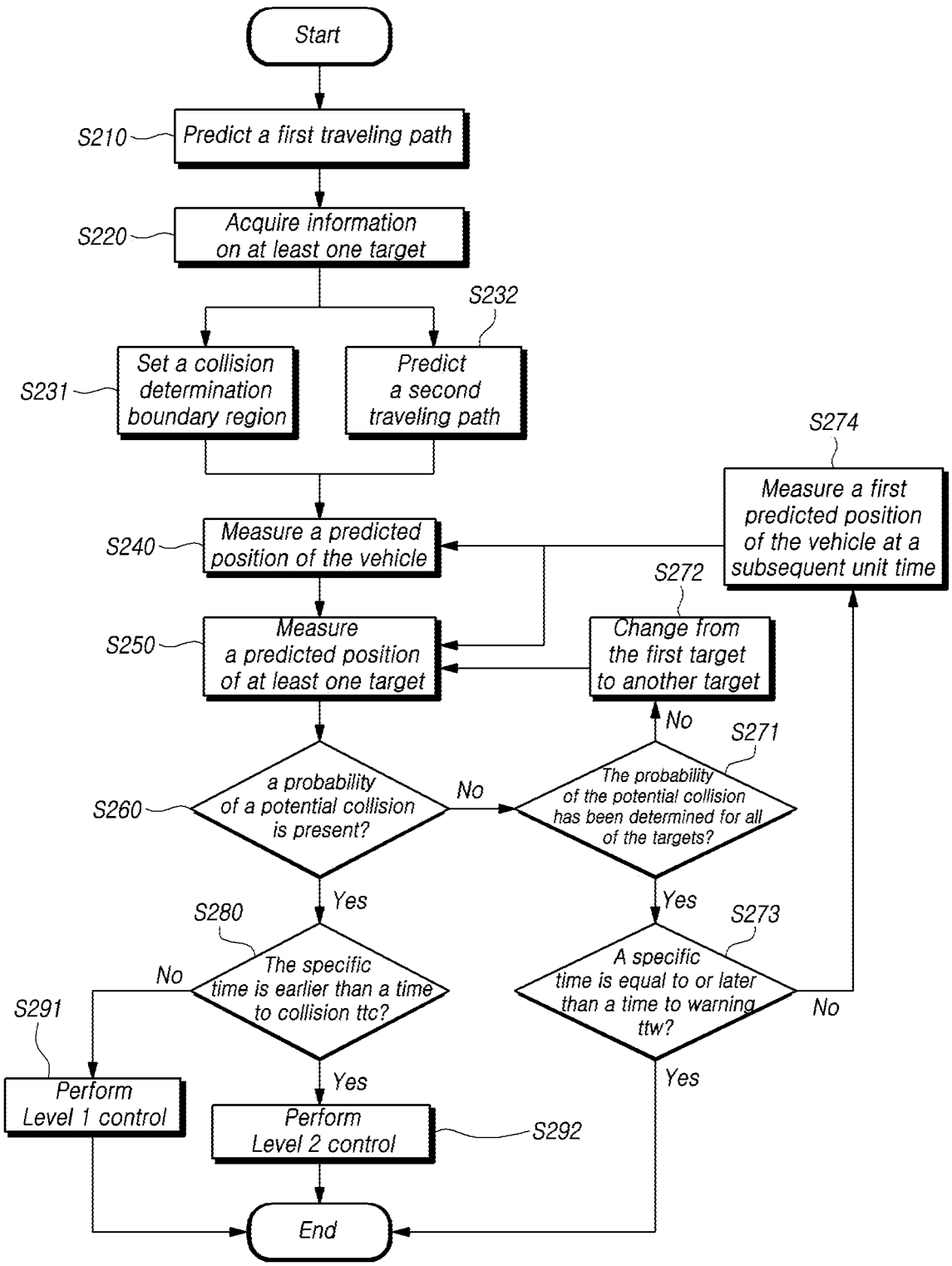
FIG. 15 is a flow chart for specifically explaining the vehicle control method according to aspects of the present disclosure.

FIG. 15 is a flow chart for specifically explaining the vehicle control method according to aspects of the present disclosure.

Referring to FIG. 15, the vehicle control device 200 aspects of the present disclosure can predict a first traveling path of the vehicle 400, at step S210. For example, the vehicle traveling path predicter 210 can measure a trajectory of the coordinates P(Δx, Δy) using a turning radius (R) for the rear wheel (B), a traveling distance (S), and a heading angle (Δθ) based on the bicycle modeling, and thereby, predict the first traveling path of the vehicle.

Next, the vehicle control device 200 can acquire information on at least one target, at step S220, set a collision determination boundary region 410 based on the target information, at step S231, and predict a second traveling path of the target. For example, the target traveling path predicter 220 can identify the target based on object detection information from one or more object detection sensors, predict the second traveling path. In addition, the target traveling path predicter 220 can detect or extract the number of targets, types of targets, shapes of targets, traveling speeds of targets, and the like, and provide the detected or extracted information to the collision probability determiner 230. Thereafter, the collision probability determiner 230 can set the collision determination boundary region 410 based on the information received from the target traveling path predicter 220.

Next, the vehicle control device 200 can measure a predicted position of the vehicle 400, at step S240. For example, the collision probability determiner 230 can measure a first predicted position of the vehicle 400 every unit time set in advance.

Next, the vehicle control device 200 can measure respective predicted positions of one or more targets, at step S250. For example, in a situation where three targets are detected, the collision probability determiner 230 can measure a second predicted position of a first target every unit time set in advance. However, embodiments of the present disclosure are not limited thereto.

Next, the vehicle control device 200 can determine whether the probability of a potential collision between the vehicle 400 and one or more targets is present, at step S260. For example, in a situation where three targets are detected, the collision probability determiner 230 can determine the probability of the potential collision based on whether the collision determination boundary region 410 is overlaid with the first target at a specific time.

If the probability of the potential collision is not present, the vehicle control device 200 can check whether the probability of the potential collision has been determined for all of the targets, at step S271. If the probability of the potential collision has not been determined yet for all of the targets, the vehicle control device 200 can change from the first target to another target, at step S272, measure a second predicted position of the changed target, and determine whether the probability of a potential collision between the vehicle 400 and the target is present, at step S260.

For example, in a situation three targets are detected and only the possibility of the potential collision between the vehicle 400 and the first target 01 has been determined, the collision probability determiner 230 can change a target for which a second predicted position is to be measured from the first target 01 to a second target 02, measure the second predicted position of the second target 02, and determine whether the probability of a potential collision between the vehicle 400 and the second target 02 is present. Thereafter, in the same manner, the above-described operations can be performed with respect to the third target 03. However, embodiments of the present disclosure are not limited thereto.

On the other hand, if the probability of the potential collision has been determined for all of the targets, the vehicle control device 200 can determine whether the specific time is equal to or later than a time to warning ttw as a reference time for warning, at step S273. If the specific time is earlier than the time to warning ttw, the vehicle control device 200 can measure a first predicted position of the vehicle 400 at a subsequent unit time S274, at step S240, and measure a respective second predicted position of each target again, at step S250.

Here, the time to warning may refer to a preset period for repeatedly determining a probability of a potential collision, or a time serving as a reference for terminating the probability of the potential collision.

On the other hand, if the probability of the potential collision between the vehicle 400 and at least one target is present, the vehicle control device 200 can determine whether the specific time is earlier than a time to collision ttc, at step S280, and if the specific time is later than the time to collision ttc, the vehicle control device 200 can perform Level 1 control, at step S291. On the other hand, if the specific time is earlier than the time to collision, the vehicle control device 200 can perform Level 2 control, at step S292.

In one embodiment, in the Level 1 control, a warning control operation can be performed, but a movement control operation for controlling the movement of the vehicle 400, such as braking control, avoidance control, and the like, may not performed. In the Level 2, the movement control operation, as well as the warning control operation, can be performed. However, embodiments of the present disclosure are not limited thereto.

As described above, according to the embodiments described herein, it is possible to provide vehicle control methods and devices that are capable of predicting a more accurate traveling path of the vehicle and/or at least one target by calculating a turning radius with respect to at least one vehicle wheel contacting the ground in an environment with a low probability of slipperiness, and vehicle control systems including the vehicle control device and capable of performing the vehicle control method.

In addition, according to the embodiments described herein, it is possible to provide vehicle control methods and devices that are capable of maximizing a calculation speed and minimizing power consumption by calculating a turning radius based on at least one rear wheel for vehicles traveling at a low speed, and vehicle control systems including the vehicle control device and capable of performing the vehicle control method.

In addition, according to the embodiments described herein, it is possible to provide vehicle control methods and devices that are capable of protecting other vehicles or pedestrians present outside, as well as occupants of vehicles, by differently setting criteria or conditions for determining a probability of a potential collision according to information on targets such as types of targets, shapes of targets, and the like, and vehicle control systems including the vehicle control device and capable of performing the vehicle control method.

The above description and attached drawings have been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATIONS

This application is the national stage of International Application No. PCT/KR2020/006631, filed on May 21, 2020, which claims the priority benefit under 35 U.S.C § 119 (a) of Patent Application No. 10-2019-0067524, filed on Jun. 7, 2019 in Korea, the entire contents of which are incorporated herein by reference.

What is claimed is:

1. A vehicle control device comprising a processor configured to:
   calculate a turning radius based on a steering angle of a steering wheel and a steering ratio of a vehicle when a vehicle speed of the vehicle is equal to or less than a preset speed, calculate a traveling distance, which is a distance in which the vehicle travels while the vehicle is turning, based on at least one of the vehicle speed and a pulse signal of at least one vehicle wheel, and predict a first traveling path of the vehicle based on the turning radius and the traveling distance;
   identify a target based on information acquired by detecting objects in the vicinity of the vehicle, and predict a second traveling path of the target;
   set a collision determination boundary region corresponding to a size of the vehicle, and determine a probability of a potential collision between the vehicle and the target based on the collision determination boundary region, the first traveling path, the target, and the second traveling path; and control at least one of a warning control, a braking control, and an avoidance control to be performed when the probability of the potential collision between the vehicle and the target is present, wherein the processor is further configured to:

measure each of a first predicted position of the vehicle present on the first traveling path and a second predicted position of the target present on the second traveling path every unit time set in advance, determine the probability of the potential collision based on whether the collision determination boundary region moving on the first traveling path is overlaid with the target traveling on the second traveling path, and determine that the probability of the potential collision is present when a collision determination boundary region at the first predicted position and the target at the second predicted position, which are predicted at a specific time, are overlaid with each other.

2. The vehicle control device according to claim 1, wherein the processor is configured to calculate a steering angle of the at least one wheel based on the steering angle of the steering wheel and the steering ratio, and calculate the turning radius using the steering angle of the at least one wheel and a distance between wheel shafts stored in advance.

3. The vehicle control device according to claim 2, wherein the processor is configured to:

based on a vehicle modeling, store in advance respective multiple steering ratios corresponding to multiple front wheels included in vehicle modeling related information, calculate respective steering angles of the multiple front wheels based on the steering angle of the steering wheel and the multiple steering ratios, calculate multiple radii using the respective steering angles of the multiple front wheels and a first distance between wheel shafts set in advance, and calculate the turning radius of the vehicle using the calculated multiple radii.

4. The vehicle control device according to claim 2, wherein the processor is configured to:

based on a bicycle modeling, store in advance a steering ratio corresponding to a front wheel included in bicycle modeling related information, calculate a steering angle of the front wheel based on the steering angle of the steering wheel and the steering ratio, and calculates the turning radius using the steering angle of the front wheel and a second distance between wheel shafts set in advance.

5. The vehicle control device according to claim 2, wherein the processor is configured to calculate the turning radius for at least one rear wheel of the vehicle.

6. The vehicle control device according to claim 5, wherein the processor is configured to:

based on a vehicle modeling, calculate respective radii of multiple rear wheels included in vehicle modeling related information, and calculate the turning radius for the rear wheels of the vehicle by averaging the respective radii of multiple rear wheels.

7. The vehicle control device according to claim 1, wherein the processor is configured to:

calculate a heading angle of the vehicle using the turning radius and the traveling distance, calculate a traveling displacement of the vehicle based on the turning radius and the heading angle, and predict the first traveling path based on the heading angle and the traveling displacement.

8. The vehicle control device according to claim 1, wherein the processor is configured to:

identify a type of the target, and when the target is an immovable target, determines that the prediction of the second traveling path is not required, and when the target is a movable object, predict the second traveling path by detecting a traveling speed of the target from the object detection information.

9. The vehicle control device according to claim 1, wherein the processor is configured to modify a size of the collision determination boundary region based on a type of the target.

10. The vehicle control device according to claim 9, wherein the processor is configured to increase the size of the collision determination boundary region when the target is a pedestrian.

11. The vehicle control device according to claim 1, wherein the processor is configured to compare the vehicle speed of the vehicle with a reference vehicle speed set in advance, and modify a size of the collision determination boundary region based on a result of the comparing.

12. The vehicle control device according to claim 11, wherein the processor is configured to increase the size of the collision determination boundary region when the vehicle speed is equal to or greater than the reference vehicle speed.

13. The vehicle control device according to claim 1, wherein the processor is configured to increase a size of the collision determination boundary region according to, or in proportion to, the vehicle speed of the vehicle.

14. The vehicle control device according to claim 1, wherein the processor is configured to modify a size of the collision determination boundary region based on a shape of the target.

15. The vehicle control device according to claim 14, wherein the collision determination boundary region is adjusted to be increased according to, or in proportion to, a size of the target determined based on the shape of the target.

16. A vehicle control system comprising:

a steering angle sensor configured to detect a steering angle of a steering wheel;

a vehicle speed sensor configured to detect a speed of a vehicle;

an object detection sensor configured to detect objects in the vicinity of the vehicle;

a vehicle control device mounted to the vehicle; and a processor included in the vehicle control device, and configured to determine a probability of a potential collision between a target present in the vicinity of the vehicle and the vehicle, and control the vehicle when the probability of the potential collision is present, wherein the processor is configured to receive steering angle information from the steering angle sensor, vehicle speed information from the vehicle speed sensor, and object detection information from the object detection sensor, calculate a turning radius based on the steering angle and a steering ratio of the vehicle when a vehicle speed of the vehicle is equal to or less than a preset speed, calculate a traveling distance, which is a distance in which the vehicle travels while the vehicle is turning, based on the vehicle speed, predict a first traveling path of the vehicle based on the turning radius and the traveling distance, predict a second traveling path of the target by identifying the target based on the object detection information, set a collision determination boundary region corresponding to a size of the vehicle, determine a probability of a potential collision between the vehicle and the target based on the collision determination boundary region, the first traveling path, the target, and the second traveling path, and control to perform at least one of a warning control, a braking control, and an avoidance control when the probability of the potential collision between the vehicle and the target is present, measure each of a first predicted position of the vehicle present on the first traveling path and a second predicted position of the target present on the second traveling path every unit time set in advance, determine the probability of the potential collision based on whether the collision determination boundary region moving on the first traveling path is overlaid with the target traveling on the second traveling path, and determine that the probability of the potential collision is present when a collision determination boundary region at the first predicted position and the target at the second predicted position, which are predicted at a specific time, are overlaid with each other.

17. A vehicle control method comprising:

calculating a turning radius based on a steering angle of a steering wheel and a steering ratio of a vehicle when a vehicle speed of the vehicle is equal to or less than a preset speed, calculating a traveling distance, which is a distance in which the vehicle travels while the vehicle is turning, based on a vehicle speed of the vehicle, and predicting a first traveling path of the vehicle based on the turning radius and the traveling distance;

identifying a target based on information acquired by detecting objects in the vicinity of the vehicle, and predicting a second traveling path of the target;

setting a collision determination boundary region corresponding to a size of the vehicle, and determining a probability of a potential collision between the vehicle and the target based on the collision determination boundary region, the first traveling path, the target, and the second traveling path; and controlling at least one of a warning control, a braking control, and an avoidance control to be performed when the probability of the potential collision between the vehicle and the target is present, wherein the determining the probability of the potential collision comprising:

measuring each of a first predicted position of the vehicle present on the first traveling path and a second predicted position of the target present on the second traveling path every unit time set in advance, determining the probability of the potential collision based on whether the collision determination boundary region moving on the first traveling path is overlaid with the target traveling on the second traveling path, and determining that the probability of the potential collision is present when a collision determination boundary region at the first predicted position and the target at the second predicted position, which are predicted at a specific time, are overlaid with each other.

\* \* \* \* \*